United States Patent [19]

Johnson

[11] 4,274,532
[45] Jun. 23, 1981

[54] CAN HANDLING SYSTEM

[76] Inventor: Fred I. Johnson, 369 Montrose Ave., Elmhurst, Ill. 60126

[21] Appl. No.: 61,651

[22] Filed: Jul. 26, 1979

[51] Int. Cl.³ .................. B65G 37/00; B65G 25/04; B65G 47/31
[52] U.S. Cl. ............................... 198/429; 118/239; 118/258; 198/461; 198/472; 198/475; 198/580; 198/648; 198/651; 198/652
[58] Field of Search ............... 198/429, 461, 472, 475, 198/575, 579, 580, 645, 648, 651, 652, 689; 118/230, 239, 258, 259, 500

[56]  References Cited

U.S. PATENT DOCUMENTS

| 1,559,199 | 10/1925 | Straight | 198/472 X |
|---|---|---|---|
| 1,883,369 | 10/1932 | Hardman | 198/429 X |
| 2,768,656 | 10/1956 | Day et al. | 198/461 X |
| 3,410,406 | 11/1968 | Tsuda et al. | 198/472 X |
| 3,557,933 | 1/1971 | Sopher | 198/461 X |
| 3,650,373 | 3/1972 | Kern et al. | 198/472 X |
| 3,698,536 | 10/1972 | Pray et al. | 198/651 X |
| 3,958,683 | 5/1976 | Schregenberger | 198/689 X |
| 4,138,965 | 2/1979 | Riese et al. | 118/230 X |

Primary Examiner—James L. Rowland

Attorney, Agent, or Firm—Wegner, Stellman, McCord, Wiles & Wood

[57]  ABSTRACT

A can handling system for transporting cans with an open end through an oven for drying of printed material applied to the exterior of the can comprising, a plurality of free-standing can carriers, each having a base and an upstanding member centrally thereof to engage within a can and hold a can in inverted position and with the base and upstanding member being of a size to position a can to prevent contact between two cans when a pair of can-carrier bases are in contact, transport structure for advancing cans sequentially at uniformly spaced intervals to a loading station, conveying and synchronizing structure for advancing can carriers sequentially to said loading station to have the can engaging members of the can carriers at the same spacing as the cans arriving at the loading station whereby cans may be transferred sequentially to sequential can carriers, and conveyor structure for conveying the can carriers to an oven in single-file relation and thereafter moving the can carriers and cans through the oven in successive transverse rows and after movement through the oven to an unloading station where the cans are removed from the can carriers.

15 Claims, 7 Drawing Figures

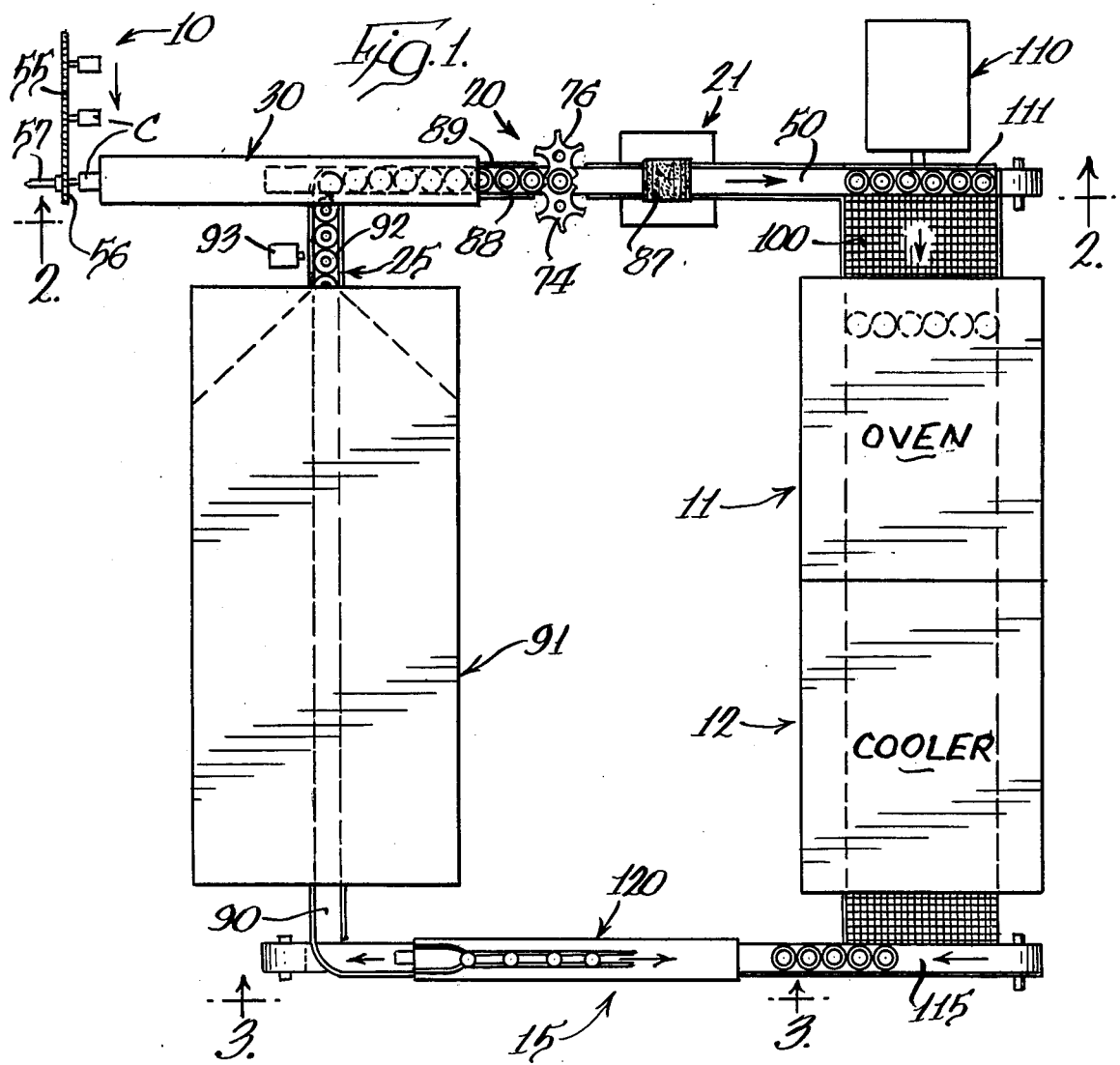
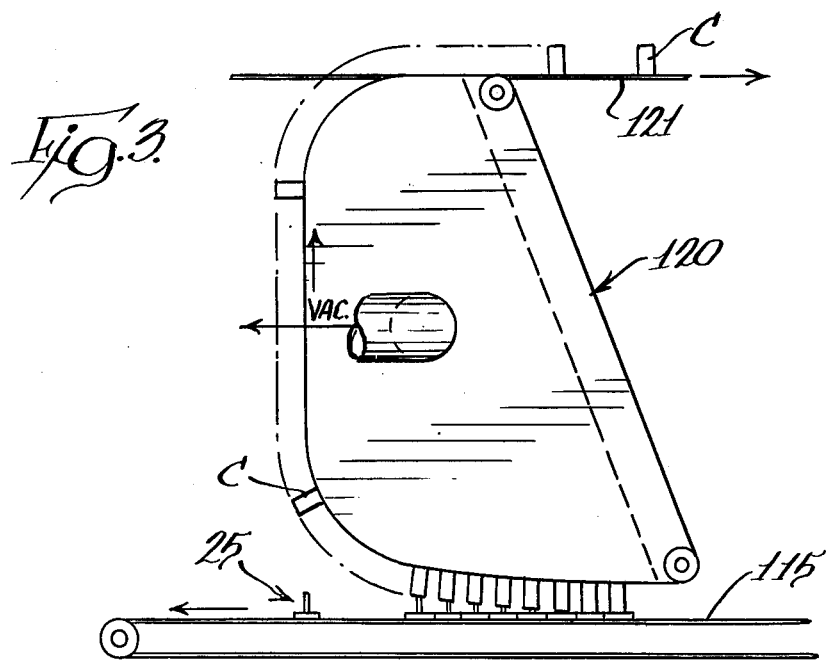

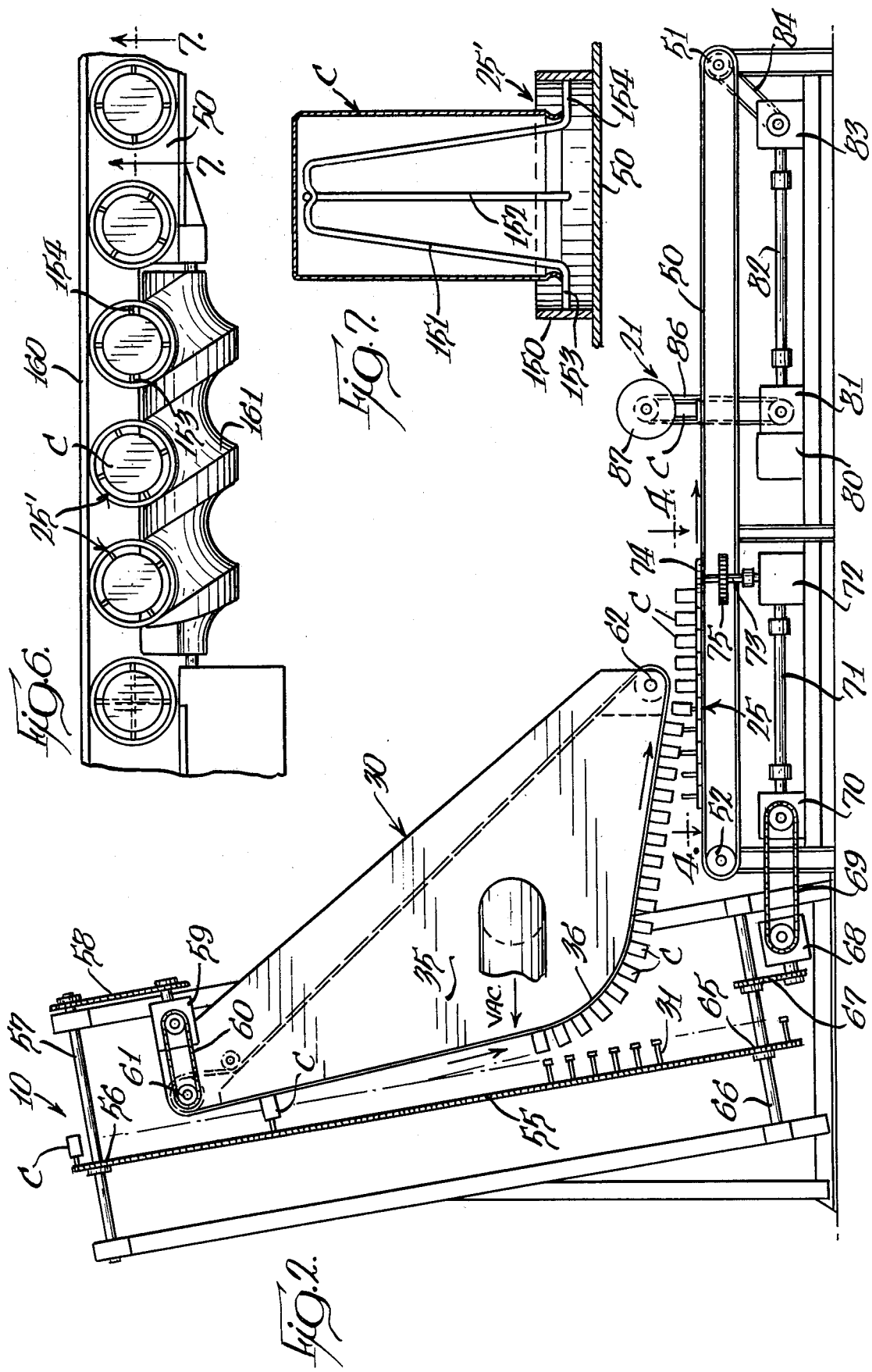

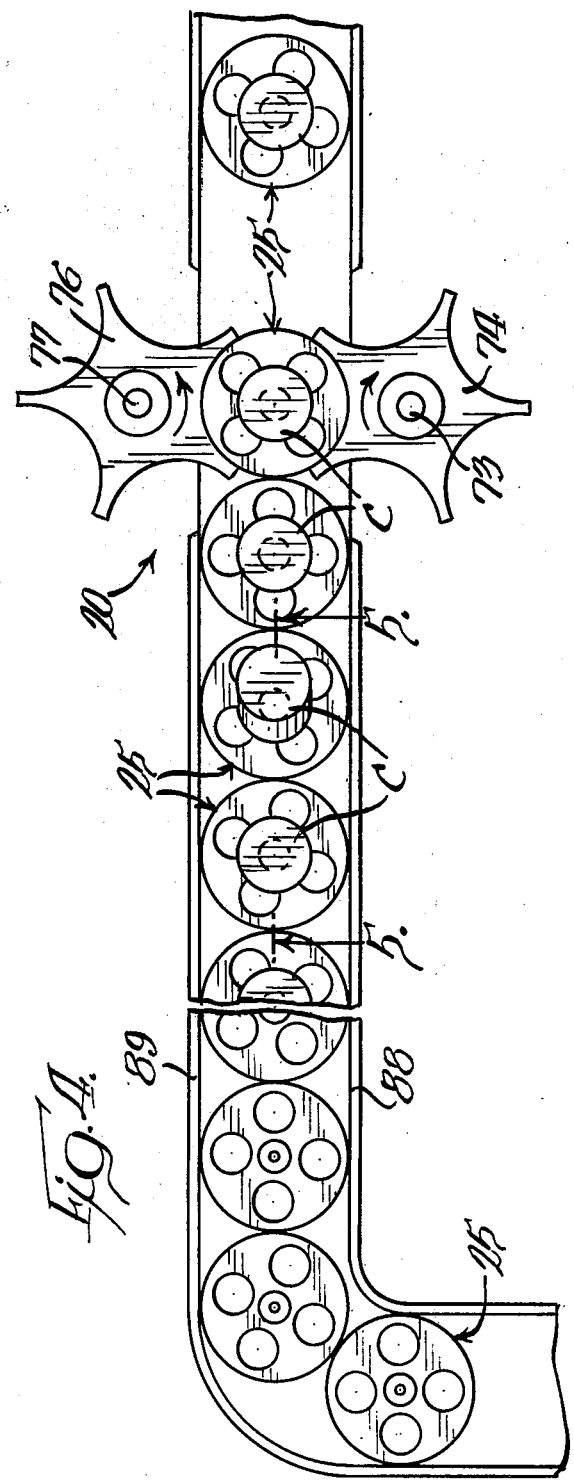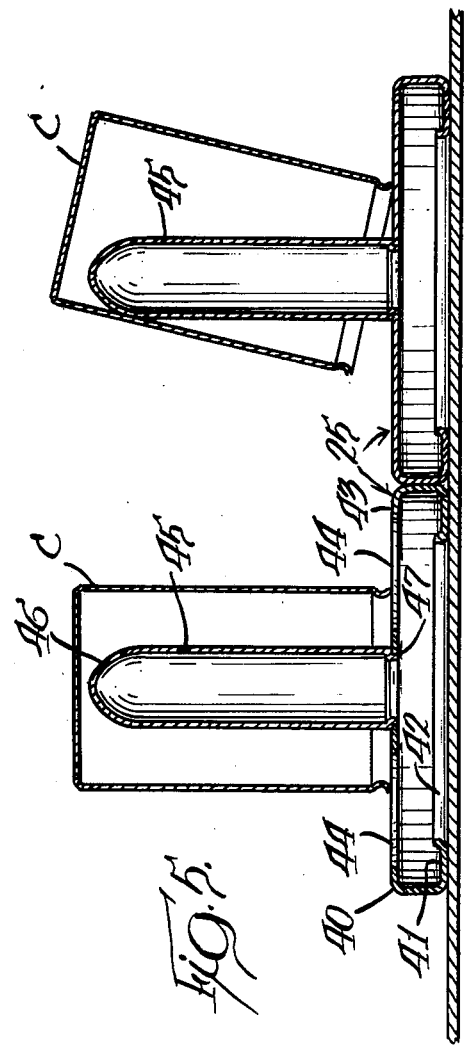

CAN HANDLING SYSTEM

BACKGROUND OF THE INVENTION

This invention pertains to a can handling system for handling case, such as beverage cans, which have printed material and varnish applied thereto and which must be moved through an oven for baking of the applied material without contact between the cans.

More particularly, the invention pertains to a can handling system wherein individual cans are mounted upon individual free-standing can carriers and the can carriers are conveyed to and through an oven, with each can mounted in a manner to prevent contact with a can on an adjacent can carrier.

Many cans, particularly beverage cans, are printed before filling by movement through a high speed printing machine that can handle several hundred cans per minute. It is conventional to associate a pin chain conveyor with the printer or coater for conveying the printed cans from the printer and directing festooned lengths of the pin chain conveyor through an oven for drying or baking the printed material as well as varnish that has been applied to the can bottom. In order to handle the production rate of the printer, it is necessary to have a large oven and a substantial length of pin chain conveyor in order to provide the festoons which results in substantial cost. There is a drive relation between the pin chain conveyor and the printer or coater and, as a result, frequent stoppages of the structure, due to malfunctions in the printing machine, has resulted in the stoppage of the pin chain conveyor, including the festooned lengths in the oven. This causes overheating and improper treatment of some cans within the oven. Efforts to avoid this have necessitated "quick cool" and "quick heat-up" features within the oven which are costly and not fully reliable in operation.

One example of a system attempting to avoid the use of a pin chain conveyor with an oven is shown in Schregenberger U.S. Pat. No. 3,958,683. The patent discloses a conveyor system wherein cans are handled by several different vacuum units for removal from a pin chain conveyor and placement in rows for travel through an oven. The conveyor handling structure disclosed in this patent embodies many complex mechanisms and requires repeated engagement and release of cans with there being the possibility of a can not remaining in erect position.

A commercially available system utilizes an oven wherein the cans pass through the oven single file at a constant speed and prior to entry into the oven are removed from the pin chain conveyor. This system avoids the problems effected by stoppage of the pin chain. However, problems are encountered in this system with the conveyor and the short time cycle for baking of a can when the cans have to run up to speeds of 800 to 1,000 cans per minute through an oven of a reasonable length.

SUMMARY OF THE INVENTION

A primary feature of the invention disclosed herein is to provide a can handling system which enables the use of a standard conventional oven with a belt which can run at a comparatively slow speed and still provide ample time for a conservative bake process. The can handling system avoids the problems encountered with the use of a pin chain conveyor travelling through an oven by removal of the cans from the pin chain conveyor and associating each can with its individual can carrier and with the can carriers being conveyed to and from the oven in single file and being arranged in transverse rows for travel through the oven on the belt thereof at a normal rate of speed.

In one embodiment of the invention, the can handling system comprises a plurality of free-standing can carriers each having means loosely engageable within a can to hold a can in inverted position and a base of a size to prevent contact between two cans when a pair of can carrier bases are in contact, means for advancing cans sequentially at uniformly spaced intervals to a loading station, means for advancing can carriers sequentially to the loading station to have the can engaging means of the carriers at the same center-to-center distance as the cans to each receive a can thereon, and means for conveying the can carriers to and through the oven in transverse rows through the oven and to an unloading station where the cans are removed from the can carriers.

More particularly, in one embodiment, the can carriers each have a base, which is generally cylindrical and of a diameter equal to the center-to-center distance between pins on the pin chain conveyor and therefore equal to the center-to-center spacing of the cans and with the can engaging means being in the form of an upwardly-extending rod extending centrally from the base and of as small a size as possible to facilitate placement of a can thereover while still holding the can in position whereby cans on adjacent can carries cannot contact even when the bases of the can carriers are in contact. Additionally, the rod is of a length less than the height of the can whereby the open end of the can may rest firmly on the base to facilitate passage thereof through a varnish unit for applying varnish to the bottom of a can which is located downstream of the loading station.

A preferred embodiment for tighter grouping of the cans during travel through the oven utilizes a can carrier having a cylindrical base of a diameter less than that set forth in the preceding paragraph and having can engaging means extending upwardly from the center thereof which is of a larger size than the rod mentioned previously to permit less shift of the can relative to the base whereby contact between cans on adjacent can carriers is still prevented.

With the new and improved can handling system, a large volume of cans can be handled for passage through an oven, independent of the feeding mechanism of the printer or coater, with the result that shut-downs of the printer or coater do not affect the handling of cans relative to the oven and with there being good positive handling of the cans with prevention of contact therebetween by each can being associated with its individual can carrier and the conveying structure acting on the can carriers, rather than on the cans.

BRIEF DESCRIPTION OF THE DRAWINGS

FIG. 1 is a plan view of the can handling system shown in association with a pin chain conveyor and an oven;

FIG. 2 is a vertical section, taken generally along the line 2—2 in FIG. 1 and on an enlarged scale;

FIG. 3 is a vertical section, taken generally along the line 3—3 in FIG. 1;

FIG. 4 is a fragmentary view, on an enlarged scale, of the loading station and structure associated therewith;

FIG. 5 is a vertical section, taken generally along the line 5—5 in FIG. 4 and on a further enlarged scale;

FIG. 6 is a view, similar to FIG. 4, of an alternate embodiment of the can carrier and synchronizing structure; and FIG. 7 is a vertical sectional view, on an enlarged scale, of a can carrier of the form shown in FIG. 6.

DESCRIPTION OF THE PREFERRED EMBODIMENTS

Referring initially to FIGS. 1 and 2, the can handling system is shown in association with a pin chain conveyor, indicated generally at 10, which delivers cans from a coater or printer to the system and cans are subsequently delivered to an oven, indicated generally at 11, which has a cooler, indicated generally at 12, associated therewith. After the cans exit the cooler, they are delivered by the system to a discharge station, indicated generally at 15, where the cans are removed from the can handling system.

The can handling system has a loading station, indicated generally at 20, wherein each of the cans received from the pin chain conveyor 10 is placed on a can carrier, with the can carriers and associated cans then travelling past a can bottom varnish unit, indicated generally at 21, sequentially on their way to the entrance of the oven 11.

A pair of can carriers, indicated generally at 25, are shown in abutting relation in FIG. 5 and a series of these carriers are shown in FIG. 4 at and preceding the loading station.

The cans are transferred from the pin chain conveyor 10 to a can carrier 25 at the loading station by means of a vacuum transfer means, indicated generally at 30. As shown in FIG. 2, the vacuum transfer means 30 progressively removes a can C from a pin 31 of the pin chain conveyor and directs the can progressively downward, with the open end facing downwardly onto a can carrier 25. The vacuum transfer means 30 is a commercially-available structure, such as offered by FECO of Cleveland, Ohio. A device of this general type is shown and described in the aforesaid U.S. Pat. No. 3,958,683 and reference may be made thereto for a more detailed understanding of one form of vacuum transfer means. The vacuum transfer means 30 has a plenum 35 around which a perforate belt 36 travels whereby the downwardly-extending section of the belt which removes cans from the pin chain conveyor has a vacuum drawn therethrough for engaging the bottom of a can and with the vacuum continuing to a location where a can is substantially in final position on a can carrier 25 and the perforate belt moves past the vacuum-applying section of the unit whereby the vacuum is released and a can is released into final position on the can carrier. The pin chain conveyor 10 has the pins 31 thereon uniformly spaced apart whereby the cans are uniformly spaced as they are delivered to the loading station by the vacuum transfer means 30. A number of pins 31 and cans C have been omitted in FIG. 2 for clarity.

In the embodiment of FIGS. 1 to 5, the can carrier 25 has a generally cylindrical hollow base 40 formed of relatively thin material, such as sheet metal, with a bottom formed by a turned-in flange 41 providing a central opening 42 for reduction in weight of the can carrier. An upper panel 43 of the base has a series of openings 44 for removal of additional material and reduction in weight of the can carrier. A rod 45 formed of tubing with a formed tapered end 46, as by swaging, extends upwardly centrally of the base and has its lower end affixed thereto, as by welding at 47. The cylindrical base 40 has a diameter equal to the spacing between pins 31 of the pin chain conveyor 10 whereby as the can carriers are aligned in abutting relation at the loading station, as shown in FIG. 4, there is an assured center-to-center distance between rods 45 which is equal to the center-to-center distance between the pin chain conveyor pins 31. This establishes a relation between the can carrier rods 45 and the arriving cans which assures placement of a can on a rod. The rod 45 has a height less than the height of a can whereby the lower open end of the can may rest upon the upper panel 43 of the base 40. The diameter of the rod 45 is selected to be as small as possible to permit easy placement of a can thereon while still acting to limit the shift of a can relative to the carrier base whereby cans on adjacent can carriers cannot contact with the can carrier bases in contact.

A first conveying means, in the form of an endless belt 50 extending about a drive wheel 51 and idler wheel 52, advances can carriers 25 to and through the loading station 20, through the can bottom varnish unit 21, and to the entrance of the oven. The drive of the belt 50 and the can bottom varnish unit 21 is independent of the structure for delivering cans to the loading station and synchronizing the delivery of can carriers to the delivery of cans. Because of this, the belt 50 is of a material which permits relative movement between it and a can carrier. The chain 55 of the pin chain conveyor is driven by a drive sprocket (not shown) and has an elevated horizontal reach shown in FIG. 1 and passing about a sprocket 56 mounted on a shaft 57 where the path of the pin chain extends downwardly and as shown in FIG. 2. The sprocket shaft 57 has a chain and sprocket drive connection 58 to a right angle gear box 59 having an output by an endless drive element 60 to a drive shaft 61 which drives the belt 36 of the vacuum transfer means with the belt passing about an idler wheel 62 at its lower end. At the lower end of its path of travel in FIG. 2, the pin chain 55 passes about a sprocket 65 on a shaft 66, with this shaft being connected by a chain and sprocket drive 67 to a right angle gear box 68 which is interconnected by an endless drive member 69 to a second right angle gear box 70 which connects by means of a shaft 71 with flexible couplings to a right angle gear box 72. The latter gear box drives an escapement timer comprising a pair of rotatable star wheels for synchronizing the movement of cans and can carriers. An upright output shaft 73 from the gear box 72 has a star wheel 74 at the upper end thereof and also a gear 75 intermediate its ends which interconnects with another gear (not shown) on a shaft 77 for a second star wheel 76.

The drive described above from the pin chain shaft 57 to the star wheels 74 and 76 results in all of the drivingly interconnected components operating in a timed relation. The drive of the belt 50 is distinct therefrom in that a motor 80 drives a gear box 81 having a shaft 82 with flexible couplings connected to a right angle gear box 83 with an output shaft connected by an endless drive member 84 to the drive wheel 51 for the belt 50. An additional output from the gear box 81 drives a vertically-extending endless drive member 86 for rotating a varnish-applying wheel 87 of the can bottom varnish unit whereby the wheel 87 is operated in timed relation to the movement of a can bottom therebeneath as the can is moved by the conveyor 50.

The conveyor 50 runs at a speed approximately 10% faster than the pin chain conveyor 10 to provide a jam feed of can carriers 25 to the escapement timer provided by the star wheels 74 and 76. The can carriers are held in jam feed relation by side guides 88 and 89 at opposite sides of the conveyor 50. This slightly higher speed also results in spacing of the can carriers relative to the bottom varnish unit as each successive can carrier leaves the escapement timer. The drive of the conveyor 50 is independent of the pin chain conveyor and can be adjusted to give the best results. Although not shown, a delay timer of approximately 5 seconds can be utilized to stop the conveyor 50 when there is a stoppage of the pin chain conveyor 10 and which will result in clearing can carriers through the can bottom varnish unit and enable removal of all can carriers from the conveyor into the oven.

The jam feed of can carriers 25 to the loading station is accomplished by a conveyor 90 which extends through a sponge conveyor, indicated generally at 91, and has an outlet end 92 feeding into the first conveyor 50. A proximity switch 93 detects the absence of can carriers and has an electric timer whereby if can carriers do not go by the switch, the system is stopped until the can carriers arrive.

The sponge conveyor 91 is a commercially available structure and permits accumulation of can carriers therein when there is an excess beyond those which can be jam fed seriatim to the loading station.

As seen in FIG. 2, the cans C move progressively downward onto the rods 45 of the can carriers until the can lower ends rest on the base of the can carriers and the can carriers are sequentially released by rotation of the star wheels 74 and 76. Because of the increased speed of the first conveyor 50, the can carrier and can rapidly move from the loading station through the can bottom varnish unit and then to the entrance of the oven 11. As seen in FIG. 1, a row of can carriers, while supported on the first conveyor 50, can then be moved as a transverse row onto a conventional mesh belt 100 which travels through the oven 11 and the cooler 12. This movement can be accomplished by a curved guide bar or, as shown, by a conventional transfer device, indicated generally at 110, having a pusher 111 which is periodically actuated to engage and move a transverse row of can carriers onto the belt 100. After travel of the can carriers and cans through the oven and cooler at a desired rate for a conservative bake process of the coating applied to the can exterior, the transverse row of can carriers and can are delivered to a can carrier feeding means in the form of a belt 115 which extends to a location at the entry end of conveyor 90. During the travel of the can carriers and cans on the feeding means 115, the cans are removed from the can carriers at the unloading station by a vacuum transfer means, indicated generally at 120, of the same general construction as the vacuum transfer means 30 whereby the cans C are progressively lifted off the can carriers and raised to a cable conveyor 121 which conveys the cans to the desired location.

In operation of the structure shown in FIGS. 1 to 5, the motor 80 causes operation of the conveyor belt 50 at a speed slightly in excess of the speed of operation of the pin chain conveyor 10 and the vacuum transfer means 30. A jam feed line of can carriers 25 is directed from the sponge conveyor 91 whereby the bases of a series of can carriers are in abutting relation up to a can carrier located at the synchronizing star wheels 74 and 76 for orientation relative to cans being delivered by the vacuum transfer means 30. The vacuum transfer means 30 and the pin chain conveyor are driven at the same speed through the connecting drive previously described and the pins 31 on the pin chain conveyor have the same center-to-center distance as the center-to-center distance between the rods 45 of the can carriers. With this relation, successive cans progressively move onto the rods of the can carriers as shown in FIG. 2. The can carrier at the synchronizing star wheels is advanced therethrough by rotation of the star wheels for movement through the can bottom varnish unit and then to a position where a row of can carriers is moved by the transfer device 110 into the oven by placement on the wire mesh belt 100 to form a transverse row whereby a large number of cans can be baked in the oven during a conservative baking process. Thereafter, the can carriers and cans leave the cooler section 12 and move onto the conveyor belt 115 which conveys the can carriers to the discharge or unloading station where the vacuum transfer means 120 lifts the cans C off the rods 45 and elevates the cans successively to the conveyor 121. The can carriers 25 return for reuse by travel through the sponge conveyor 91 which assures a constant supply of can carriers to the loading station and with the proximity switch 93 being connected in a suitable circuit whereby if there is a failure of can carriers to pass thereby, the system is shut down.

In the foregoing embodiment, the diameters of the can carrier bases 40 are the same as the spacing between pins 31 on the pin chain conveyor whereby the center-to-center distance of the rods 45 is equal to the center-to-center distance of the pins. For increased handling capacity, the can carriers may have a base of a reduced size, with the result that there can be a greater number of cans in a transverse row passing through the oven. A preferred embodiment of such a can carrier and a different synchronizing structure for the can carriers relative to delivery of cans thereto at the loading station is shown fragmentarily in FIGS. 6 and 7.

In this embodiment, the can carrier 25' has a base formed as an annular ring 150 and which has a diameter less than the center-to-center spacing between the pins 31 of the pin chain conveyor. As an example, the pins 31 of a conventional pin chain conveyor are approximately on $5\frac{1}{4}''$ centers and the bases 40 of the can carriers 25 in the embodiment of FIGS. 1 to 5 have the same diameter. The can carrier 25' in FIG. 7 may have a diameter of $3\frac{1}{2}''$ or larger and be less than the center-to-center spacing between the pins 31.

The can engaging means is formed by two crossed lengths of wire 151 and 152 and which are shaped for crossing over at their midpoint and have their ends turned outwardly, as shown at 153 and 154 for the wire 151 and which are welded to the interior surface of the ring 150. A major part of the length of each wire is formed into two downwardly, outwardly sloped sections whereby there are a total of four downwardly and outwardly sloped sections which form a generally frusto-conical shape for the can engaging member onto which a can is placed. This structure has a larger effective diameter than the rods 45 in the embodiment of FIGS. 1 to 5 whereby a can C has less freedom for shift relative to the base. The lower end of the cam makes four-point contact with the two wires to provide for a firm seating of the can on the can engaging member to provide firm support thereof for passage through the can bottom varnish unit 21.

Because of the reduced diameter of the can carrier bases 150, it is not possible to have the can carriers in abutting location at the loading station, as in the embodiment of FIGS. 1 to 5. Because of this, a different synchronizing system is used at the loading station, with there being a guiding wall 160 extending along one side of the conveyor belt 50 and with a rotatable timing screw 161 located along the opposite edge of the conveyor belt. The spiral thread of the timing screw provides space between the can carriers and functions to maintain a center-to-center distance between the can engaging parts of the can carriers which is equal to the spacing between the pins 31 on the pin chain conveyor. The timing screw 161 can be rotated through the drive mechanism described in the previous embodiment and by connection to the shaft 73 extending outwardly from the right angle gear box 72.

I claim:

1. A can handling system for transporting cans with an open end through an oven comprising, a plurality of free-standing can carriers each having can alignment means loosely engageable within a can to hold a can in inverted position and a base of a size to prevent contact between two cans when a pair of can carrier bases are in contact, means including a pin chain conveyor for advancing cans sequentially at uniformly spaced intervals to a loading station, means for advancing can carriers sequentially to said loading station to have the can-engaging means of the carriers at the same center-to-center distance as said cans carried by the pin chain conveyor to each receive a can thereon, and means for conveying said can carriers to and through said oven and to an unloading station where the cans are removed from the can carriers.

2. A system as defined in claim 1 wherein the can-engaging means of a can carrier comprises a rod extended upwardly from the can carrier base and centrally thereof, said rod having a height less than that of a can to enable the open end of a can to squarely rest on said base.

3. A system as defined in claim 2 including a bottom varnish unit downstream of said loading station for applying varnish to the bottom of a can.

4. A system as defined in claim 1 wherein the means for conveying can carriers to and through said oven includes a first conveyor extending from said loading station to an entrance of the oven, a second conveyor travelling through the oven at an angle to said first conveyor and of a width to transport tranverse rows of can carriers, and means at said oven entrance for transferring a row of can carriers from the first conveyor to the second conveyor.

5. A system as defined in claim 1 wherein the base of a can carrier is cylindrical and has a diameter equal to the center-to-center spacing between cans, and means at said loading station for maintaining a row of can carriers in abutting positions oriented to the arrival of cans at said loading station.

6. A system as defined in claim 1 wherein the base of a can carrier is cylindrical and of a diameter less than the center-to-center spacing between cans arriving at the loading station, and means at said loading station to maintain a spacing between can carriers whereby the center-to-center spacing therebetween equals that of the cans.

7. A system as defined in claim 1 wherein said can alignment means is a relatively small diameter rod with a tapered upper end.

8. A system as defined in claim 1 wherein said can alignment means comprises a frusto-conical member of a size to fit within the can and prevent movement of the can open end beyond the edge of said base.

9. A system for handling of open-ended cans which have been printed and are mounted on a pin chain conveyor and which must be transported through an oven for baking thereof comprising, conveying means extending through a loading station and to the entrance of an oven, a plurality of individual free-standing can carriers each having a base and can alignment means extending upwardly therefrom a distance less than the height of a can, means for feeding said can carriers to said conveying means, means at said loading station for synchronizing said can carriers to the pin chain conveyor to have the alignment means of successive can carriers with the same center-to-center distance as that between pins of the pin chain conveyor, vacuum transfer means for transferring successive cans from the pin chain conveyor progressively onto successive can carriers at the loading station with succeeding travel of the can carriers to the entrance of said oven, a conveyor belt for transporting transverse rows of cans through said oven, means at the oven entrance for transferring a linear row of can carriers from the conveying means to said conveyor belt, and means adjacent the discharge end of the oven for removing cans from the can carriers and delivering the can carriers to said can carrier feeding means.

10. A system as defined in the claim 9 wherein said conveying means travels at a speed in excess of said vacuum transfer means, means for controlling the speed of a can carrier at said loading station and thereafter said conveying means moves the can carrier at the speed of the conveying means.

11. A system as defined in claim 10 including a bottom varnish unit downstream of said loading station and having varnish-applying means engageable with a can and operable at the speed of the conveying means.

12. A system as defined in claim 9 wherein the base of a can carrier is cylindrical and has a diameter equal to the center-to-center spacing between cans as moved by the vacuum transfer means, and said synchronizing means at said loading station comprises at least one star wheel engageable with successive can carriers and driven in timed relation with said pin chain conveyor.

13. A system as defined in claim 9 wherein the base of a can carrier is cylindrical and of a diameter less than the center-to-center spacing between cans arriving at the loading station, and said synchronizing means at said loading station includes at least one timing screw engageable with successive can carriers and driven in timed relation with said pin chain conveyor.

14. A system for handling of open-ended cans which have been printed and are mounted on a pin chain conveyor and which must be transported through an oven for baking of the printed material comprising, conveying means extending from a loading station to the entrance of an oven, a plurality of individual free-standing can carriers each having a base and means engageable within a can extending upwardly centrally of the base a distance less than the height of a can, means for feeding said can carriers to said loading station, means at said loading station for synchronizing said can carriers to have said engageable means to successive can carriers with the same center-to-center distance as that between pins of the pin chain conveyor, means for transferring successive cans from the pin chain conveyor progressively onto successive can carriers at the loading station with succeeding travel thereof to the entrance of said oven, a conveyor belt for transporting transverse rows of cans through said oven, means at the oven entrance for transferring a linear row of can carriers from the conveying means to said conveyor belt, and means adjacent the discharge end of the oven for removing cans from the can carriers.

15. A system as defined in claim 14 wherein said means for feeding can carriers to said loading station receives the can carriers after cans have been removed therefrom and said means includes a sponge conveyor for selectively accumulating can carriers.

* * * * *